Figure 1:
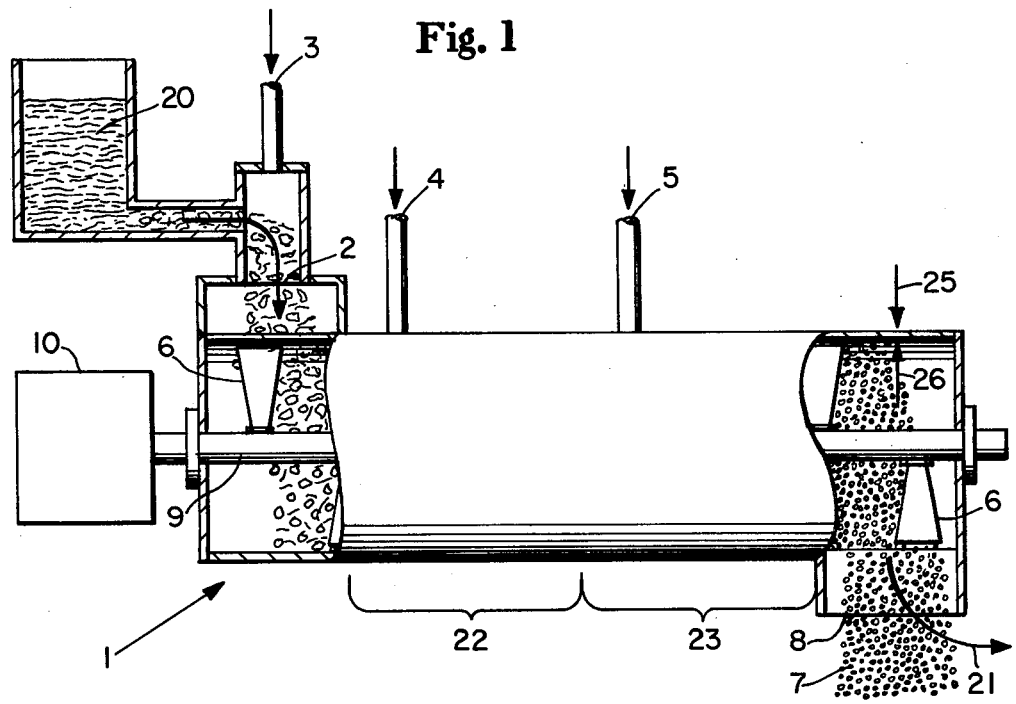

United States Patent [19]

Baird et al.

[11] 4,205,094

[45] May 27, 1980

[54] TEXTURIZING AND STEAM DEFLAVORING SOY PROTEIN WITH HIGH-SPEED TURBINE MIXING

[75] Inventors: James C. Baird, Cincinnati; Glenn R. Warfield, Hamilton, both of Ohio

[73] Assignee: The Procter & Gamble Co., Cincinnati, Ohio

[21] Appl. No.: 902,512

[22] Filed: May 3, 1978

[51] Int. Cl.² .............................................. A23J 1/14
[52] U.S. Cl. .................................. 426/459; 426/461; 426/507; 426/511; 426/656; 426/802
[58] Field of Search ............... 426/459, 461, 507, 511, 426/656, 802; 99/348, 410, 483

[56] References Cited

U.S. PATENT DOCUMENTS

| | | | |
|---|---|---|---|
| 2,260,254 | 10/1941 | Kruse et al. | 426/459 |
| 3,253,930 | 5/1966 | Gould et al. | 426/459 X |
| 3,810,764 | 5/1974 | Waggle | 426/802 X |
| 3,883,676 | 5/1975 | Strommer | 426/511 |
| 3,911,157 | 10/1975 | Bates et al. | 426/459 |

OTHER PUBLICATIONS

Bepex Corp., *Solidaire Dryer*, Catalog No. SD-509.

*Primary Examiner*—Marc L. Caroff
*Attorney, Agent, or Firm*—Leonard Williamson; Rose Ann Dabek; Richard C. Witte

[57] ABSTRACT

Defatted particulate oil seed protein material is texturized and deflavored by: (1) increasing the moisture level of said material to 25-65%; (2) steam cooking said material with direct steam; and (3) subjecting said material to high speed centrifugal turbine mixing while performing said step (2) whereby a wet, texturized, deflavored particulate oil seed material is provided. An average particulate is texturized and deflavored in few seconds. The product of this invention is especially useful as a ground beef extender.

19 Claims, 1 Drawing Figure

TEXTURIZING AND STEAM DEFLAVORING SOY PROTEIN WITH HIGH-SPEED TURBINE MIXING

TECHNICAL FIELD

The present invention relates generally to food products and methods of making them, and more particularly to an improved method of making a bland, texturized soy protein material.

BACKGROUND OF PRIOR ART

Soybeans, e.g., when crushed or flaked, are subjected to solvent defatting, the residual soy flavor and the texture of the material is objectionable, unpalatable, and not like animal meat tissue used as food.

Many attempts have been made to make this solvent defatted soybean oil meal attractive, palatable, and meatlike. U.S. Pat. No. 2,260,254 to N. F. Kruse (Central Soya Company, Inc.), issued Oct. 21, 1941, teaches a process for preparing a food product from solvent-extracted soybean meal which consists of increasing the moisture level of such meal to a value of 15–30% and steam cooking the moistened meal "at a temperature above the boiling point of water" while keeping the meal in motion during such cooking. Similarly, U.S. Pat. No. 3,253,930 to Gould et al. teaches a method of heat-treating soybeans.

U.S. Pat. No. 4,022,919, May 10, 1977 to Comer (Griffith Labs), teaches removal of bitter flavor from pea flour by contacting the flour with moist steam while mixing per se. U.S. Pat. No. 3,883,676, May 13, 1975 to Strommer (General Mills) teaches "texturing" particulate protein material in an elongated cylinder treating chamber having an in-line of continuous cutter by passing a stream of gaseous fluid such as steam through the chamber under conditions of elevated pressure and elevated temperature.

U.S. Pat. No. 3,197,310, July 27, 1965 to Kjelson (General Mills) and U.S. Pat. No. Re. 27,790, Oct. 16, 1973 to Rusoff et al (General Foods) also teach processes for texturizing defatted oil seed protein material. Generally speaking, however, these and other prior art attempts have left much to be desired in terms of basic economics and/or product quality.

It is an object of the present invention to produce a superb texturized and deflavored defatted oil seed protein material product by an economically superior process.

Another object of the present invention is to provide a process to texturize and deflavor said material which will save energy.

Yet another object of the present invention is to produce a bland cooked soy material from soy white flakes which can be used as a ground beef extender.

Still another object is to provide a method to deflavor soybean material with steam so quickly that typical off-flavors caused by overcooking do not develop.

BRIEF SUMMARY OF THE INVENTION

An improved process for making an oil seed meal-based ground beef extender by simultaneously texturizing and deflavoring defatted particulate oil seed protein material by the following steps:

1. uniformly wetting said material until its moisture content is raised to a value of from about 25% to about 65%; said material being maintained in a particulate form;
2. steam cooking the moistened material with from about 0.1 to about 2 parts of direct steam per part of material on a dry weight basis;
3. subjecting said material to high-speed centrifugal turbine mixing while performing said steam cooking step to provide a wet, texturized, deflavored particulate oil seed material.

This wet, texturized, deflavored protein oil seed material is in an excellent condition for further processing, particularly: (1) water-washing to make a super-bland material; (2) flavor addition to develop meat-like flavors; and (3) drying to a shelf-stable moisture level.

BRIEF DESCRIPTION OF THE DRAWING

FIG. 1 shows a texturizing/deflavoring flow sheet in a turbine mixer schematic.

DETAILED DESCRIPTION OF THE INVENTION

Referring to FIG. 1, a MDL 20 Dresser-Blender (modified for the process of this invention) shows a cylindrical chamber 1. (The Dresser-Blender mixer is manufactured by Wenger Mfg., Sabetha, Kansas.)

Raw material 20 is fed through inlet port 2. An inert purge gas, such as nitrogen, is introduced into said cylindrical chamber 1 through inert gas inlet port 3. Tap water is introduced through water inlet port 4. Hot steam, e.g. originating from a source that is saturated, at a pressure of 10 atmospheres, is introduced through direct steam inlet port 5 and throttled to atmospheric pressure. Turbine paddles (or blades) 6 with adjustable pitches are connected to shaft 9 which is powered by motor drive 10. The wet, texturized, deflavored product 7 is discharged along with excess steam, inert gas and flavor volatiles 21 through discharge port 8.

The hot steam is throttled to atmospheric pressure from its initial pressure source when it is introduced into the chamber 1 to cook and deflavor the raw material. Water incorporation section 22 and steam-stripping section 23 are self-explanatory. Gravity force 25 is less than the centrifugal force 26 to force the material to form a thin bed on the inner surface of the cylindrical chamber 1.

The process of this invention is superior to prior art processes primarily because of its basic economic advantages and to its simplicity and energy saving features. No additional additives are required and relatively less expensive equipment may be used. The process of this invention comprises the steps of:

1. Uniformly wetting said material until its moisture content is raised to a value of from about 25% to about 65%; said material being maintained in a particulate form;
2. steam cooking the moistened material with from about 0.1 to about 2 parts of direct steam per part of material on a dry weight basis;
3. subjecting said material to high-speed mixing while performing said steam cooking step to provide a wet, texturized, deflavored particulate oil seed material.

This wet, texturized, deflavored protein oil seed material is in an excellent condition for further processing, particularly: (1) water-washing to make a super-bland material; (2) flavor addition to develop meat-like flavors; and (3) drying to a shelf-stable moisture level.

A preferred protein material is soy meal or soy flakes which comprise 45 to 55% protein. Of course, other oil seed protein materials, well known in the art, may be used including oil seed protein concentrates.

The moisture level of the protein material is preferably raised to 35% to 60% and cooked with from 0.25 to 1.00 parts direct steam per part of raw material. The average particulate is subjected to said wetting, cooking and mixing for about 2 seconds to about 10 minutes and most preferably for 5 seconds to 2 minutes.

The high speed mixing is preferably centrifugal turbine mixing having a turbine paddle tip speed of from about 300 meters per minute (mpm) to about 1500 mpm. A suitable mixer for the process of this invention includes the Solidaire ® Dryer, manufactured by Bepex Corporation, a subsidiary of Berwind Corporation, 333 N.E. Taft St., Minneapolis, MN 55413; Telephone: (612) 331-4370, Telex: 29-0366. The Solidaire ® Dryer is described in a publication by Bepex, Catalog No. SD-509 (herein incorporated by reference in its entirety). Another suitable turbine mixer for employment in the practice of the present invention is a Wenger Continuous High-Speed Dresser/Blender Mixer TM, Wenger Manufacturing, Sabetha, Kan. 66534, Telephone 913-284-2133. A picture of this Dresser/Blender TM is shown in Wenger ® Bulletin No. 5-10-72 (herein incorporated by reference to its entirety). The Wenger ® Hi-Speed Dresser/Blender was used to prepare wet, texturized and deflavored particulate oil seed material in accordance with the process of the present invention. An additional inlet for steam was provided near the product and liquid inlet to accommodate the process of the present invention.

A preferred mixer is equipped with a large number of adjustable-pitch turbine paddles 6 which sweep close to the inner surface of the cylindrical chamber 1 to provide turbine mixing in a thin bed forced along this inside wall the cylindrical chamber 1. The mixer must operate at an angular velocity of at least that of the critical velocity, i.e., the velocity at which the gravity force on the particle is in balance with the centrifugal force. Referring to FIG. 1, because of the turbine paddle 6 arrangement on the shaft 9, a thin bed of the material travels in an angular spiral on the inner surface of the cylindrical chamber as the material moves from the inlet port 2 to the discharge port 8. The residence time in the mixer can be varied from a couple of seconds to approximately 10 minutes by adjusting the pitch of the paddle or by changing the rotor speed. The high paddle tip speed should be about 300 to 1500 mpm to create high shear and turbulence in the compact material layer, which breaks up agglomerates and continually exposes new surfaces, thus increasing heat and mass transfer to texturize and deflavor the defatted particulate oil seed protein material. A paddle tip speed of 400 mpm to 600 mpm is preferred.

The mechanical energy requirement for the process of the invention is significantly less than that required for prior art processes, especially the popular processes which employ extrusion operations.

Large quantities of mechanical power are not required in this process to generate the heat and work to deflavor and texturize the raw material as are needed in extrusion and other processes.

The wet, texturized and deflavored material product of the present invention is preferably air-dried to a shelf-stable moisture level, at a moderate temperature of from about 65° C. to about 110° C., preferably from about 80° C. to about 100° C., to prevent toasting. A shelf-stable moisture level is about 10% or less. After drying the material is of the desired texture approximating that of ground beef and has a substantially bland taste suitable of flavoring, e.g., when mixed with ground beef as an extender.

BEST MODE OF CARRYING OUT THE INVENTION

White defatted soy flakes were fed into a mixer of the type shown in FIG. 1 at a rate of about 34 kg/hr. Input water to flake rate was about 0.97 part water/part flakes. Input steam to dry flakes ratio was about 0.84 part steam/part flakes. Water temperature 70° F. Mixer rotary speed, 605 rpm or tip speed, about 480 mpm for a 25.4 cm diameter turbine. Approximate residence time for direct steam cooking, deflavoring and texturizing of the material in mixer about 17 seconds. The initial contact temperature of the direct steam is preferably 100° C. to about 180° C. The pressure inside mixer was atmospheric. Discharged product moisture level was about 55% $H_2O$. Discharged product temperature was about 98° C. Product particle size varied from a size that passes through a 4-mesh U.S. Standard screen and to a size that resides on a 30-mesh screen.

The wet, texturized and deflavored soy protein material discharged had been significantly reduced in its characteristic soybean flavor and was free-flowing (very little stickiness). After air-drying said material at a temperature of about 93° C. to a shelf-stable moisture level of about 10%, a sample of the material was rehydrated with two parts water per part flakes.

This rehydrated material was mixed, blended and ground with fresh beef 30/70 rehydrated material/beef. Hamburger patties were made and cooked. This product was compared with an extended beef product extended with a rehydrated, deflavored texturized soy protein material made in accordance with a trisolvent wash deflavoring process taught in U.S. Pat. No. 3,998,800, Dec. 21, 1976, to R. W. Youngquist (herein incorporated by reference in its entirety) and texturized using roll mills and direct steam cooking in accordance with U.S. Pat. No. 3,911,157, Oct. 7, 1975 to N. A. Bates et al. (herein incorporated by reference in its entirety), and commercially sold under the tradename Increase ®. The hamburgers made with the product of this invention were rated as equivalent or superior in texture and flavor as compared to the hamburgers made with the prior art product. The product of this invention was observed to be cellular. The material was chewy and had a mouthfeel similar to animal meat. The material was very bland and substantially free of the characteristic soy or beany taste.

Thus, the process of this invention eliminates the need for an expensive trisolvent-type deflavoring operation as taught by Youngquist. It also eliminates the need for texturizing a deflavored particulate oil seed protein material by an expensive operation such as that by Bates et al. which requires both roll milling and cooking with large quantities of direct steam.

The foregoing is the best mode of the present invention known to date. Optimization of this mode, of course, to obtain even better modes is contemplated.

We claim as our invention:

1. A process for texturizing and deflavoring defatted particulate oil seed protein material comprising the steps of:
   1. uniformly wetting said material until its moisture content is raised to a value of from about 25% to about 65%, said material being maintained in a particulate form;

2. steam cooking the moistened material with from about 0.1 to about 2 parts of direct steam per part of material on a dry weight basis;

3. subjecting said material to high-speed centrifugal mixing while performing said steam cooking step;

said high-speed centrifugal mixing being provided by a turbine mixer having a cylindrical chamber and a number of rotating paddle-blades which sweep said particulate material along the inner surface of said cylindrical chamber and wherein said high-speed mixing paddle-blades rotate at an angular velocity greater than a velocity sufficient to balance gravity force on said particulate material with centrifugal force, said blades sweeping said particulate material against said inner surface to provide sufficient high shear turbulence for fast and efficient deflavoring and texturization to produce a wet, texturized, deflavored particulate oil seed material.

2. The process of claim 1 wherein said protein material is soy meal comprising from about 45 to 55% protein.

3. The process of claim 1 wherein said moisture content value is raised to a level of from about 36% to about 60%.

4. The process of claim 1 wherein said moistened material is cooked with from about 0.25 to about 1.0 part direct steam.

5. The process of claim 1 wherein an average particulate of said material is subjected to said wetting, cooking and mixing for a total time of about 2 seconds to about 10 minutes.

6. The process of claim 5 wherein said average particulate is subjected to said wetting, cooking and mixing for a total time of about five (5) seconds to about two (2) minutes.

7. The process of claim 1 wherein said wet, texturized and deflavored material is air-dried at a temperature of from about 65° C. to about 110° C. to a shelf-stable moisture level.

8. The process of claim 7 wherein said shelf-stable moisture level is less than 10% moisture.

9. The process of claim 7 wherein said material is air-dried at a temperature of about 80° C. to 100° C.

10. The process of claim 1 wherein said high speed mixing is provided by a centrifugal turbine mixer operating at a turbine paddle tip speed of from about 300 to about 1500 mpm.

11. The process of claim 10 wherein said paddle tip speed is about 400 to 700 mpm.

12. The process of claim 1 wherein said process is carried out under atmospheric pressure conditions.

13. The process of claim 1 wherein said mixing is provided by a turbine mixer having a cylindrical chamber and a number of narrow, flat, adjustable-pitch paddles which sweep close to the inner surface of said cylindrical chamber and wherein said mixer operates at an angular velocity greater than a velocity sufficient to balance gravity force on a particulate with centrifugal force.

14. The process of claim 1 wherein said material is subjected to said high speed mixing immediately after said uniform wetting.

15. The process of claim 1 wherein said material is subjected to said high speed mixing while uniformly wetting.

16. The process of claim 1 wherein said direct steam has an initial contact temperature of from about 100° C. to about 180° C.

17. The process of claim 13 wherein said cylindrical chamber is purged by an inert gas prior to performing said mixing.

18. The process of claim 1 wherein said wet, texturized, deflavored protein oil seed material is water-washed to prepare a super-bland material and then dried to a shelf-stable moisture level.

19. The process of claim 1 wherein said wet, texturized, deflavored protein oil seed material is flavored to simulate edible animal tissue.

* * * * *